United States Patent
Kuna et al.

(10) Patent No.: US 9,765,222 B2
(45) Date of Patent: Sep. 19, 2017

(54) METHOD OF ENCAPSULATING PIGMENT FLAKES WITH A METAL OXIDE COATING

(71) Applicant: Viavi Solutions Inc., Milpitas, CA (US)

(72) Inventors: Jeffrey James Kuna, San Francisco, CA (US); Johannes P. Seydel, Petaluma, CA (US); Paula Washington, Sonoma, CA (US); Kelly Janssen, Santa Rosa, CA (US); Jianguo Fan, Santa Rosa, CA (US)

(73) Assignee: Viavi Solutions Inc., Milpitas, CA (US)

( * ) Notice: Subject to any disclaimer, the term of this patent is extended or adjusted under 35 U.S.C. 154(b) by 216 days.

(21) Appl. No.: 14/705,301

(22) Filed: May 6, 2015

(65) Prior Publication Data

US 2016/0326375 A1    Nov. 10, 2016

(51) Int. Cl.
  *C09C 3/06*  (2006.01)
  *C09C 1/64*  (2006.01)
  *C09C 1/00*  (2006.01)

(52) U.S. Cl.
  CPC .............. *C09C 1/642* (2013.01); *C09C 1/006* (2013.01); *C09C 1/0021* (2013.01); *C09C 3/06* (2013.01); *C09C 3/063* (2013.01); *C01P 2004/03* (2013.01); *C09C 2200/1054* (2013.01); *C09C 2200/1058* (2013.01); *C09C 2200/401* (2013.01)

(58) Field of Classification Search
  None
  See application file for complete search history.

(56) References Cited

U.S. PATENT DOCUMENTS

| | | | |
|---|---|---|---|
| 3,536,520 A * | 10/1970 | Hanke | C09C 1/0078 106/403 |
| 4,923,518 A | 5/1990 | Brand et al. | 106/429 |
| 5,372,638 A | 12/1994 | DePue et al. | 106/404 |
| 5,456,749 A | 10/1995 | Iwasa et al. | 106/417 |
| 5,931,996 A | 8/1999 | Reisser et al. | 106/404 |
| 5,958,125 A * | 9/1999 | Schmid | C09C 1/0015 106/415 |
| 5,989,626 A | 11/1999 | Coombs et al. | 427/162 |
| 6,013,370 A | 1/2000 | Coulter et al. | 428/403 |
| 6,150,022 A | 11/2000 | Coulter et al. | 428/403 |
| 6,157,489 A | 12/2000 | Bradley, Jr. et al. | 359/584 |
| 6,287,695 B1 | 9/2001 | Kaupp et al. | 428/403 |
| 6,379,804 B1 | 4/2002 | Ackerman et al. | 428/433 |
| 6,692,830 B2 | 2/2004 | Argoitia et al. | 428/403 |
| 6,841,238 B2 | 1/2005 | Argoitia et al. | 428/323 |
| 8,309,630 B2 | 11/2012 | Chun et al. | 523/200 |
| 8,552,070 B2 | 10/2013 | Albrecht et al. | 514/772.6 |
| 8,709,145 B2 | 4/2014 | Maul et al. | 106/404 |
| 8,821,627 B2 | 9/2014 | Kunii | 106/426 |
| 2003/0051634 A1 | 3/2003 | Takahashi | 106/403 |
| 2008/0295737 A1 | 12/2008 | Henglein et al. | 106/421 |
| 2008/0314284 A1 | 12/2008 | Li et al. | 106/31.9 |
| 2009/0079328 A1 | 3/2009 | Fedorovskaya et al. | 313/504 |

(Continued)

*Primary Examiner* — Erma Cameron
(74) *Attorney, Agent, or Firm* — Harrity & Harrity, LLP

(57) ABSTRACT

A method of encapsulating pigment flakes with a metal oxide coating is provided. According to the method, pigment flakes are mixed with a solvent, a metal salt is added to the solvent, and a reducing agent is added to the solvent, so as to encapsulate the pigment flakes with a metal oxide coating.

19 Claims, 4 Drawing Sheets

(56) References Cited

U.S. PATENT DOCUMENTS

| | | | | |
|---|---|---|---|---|
| 2010/0203093 A1* | 8/2010 | Bujard | ................ | A61K 8/0254 |
| | | | | 424/401 |
| 2011/0002970 A1 | 1/2011 | Parashar | ....................... | 424/401 |
| 2011/0269845 A1* | 11/2011 | Bujard | ................ | C09C 1/0015 |
| | | | | 514/770 |
| 2012/0282311 A1* | 11/2012 | Schmid | ................ | C09C 1/0021 |
| | | | | 424/401 |
| 2013/0131187 A1* | 5/2013 | Hashizume | ............... | C09C 1/62 |
| | | | | 514/770 |
| 2013/0209308 A1* | 8/2013 | Mazyar | ................ | B22F 1/0018 |
| | | | | 419/33 |
| 2014/0305337 A1 | 10/2014 | Suwa et al. | ................ | 106/31.65 |

\* cited by examiner

METHOD OF ENCAPSULATING PIGMENT FLAKES WITH A METAL OXIDE COATING

TECHNICAL FIELD

The present disclosure relates to a method of encapsulating pigment flakes. More particularly, the present disclosure relates to a method of encapsulating pigment flakes with a metal oxide coating.

BACKGROUND

Many metals, such as aluminum, corrode in the high-pH aqueous environment typical of water-based paints. Moreover, some dielectric materials, such as magnesium fluoride, are etched by the high-pH aqueous environment and/or contain a significant number of defects promoting environmental attack. Therefore, pigment flakes may be passivated and/or encapsulated with a metal oxide coating to inhibit environmental attack in water-based paints. However, an encapsulating metal oxide coating may not always be conformal, defect-free, impermeable to water, and inexpensive. In view of the foregoing, it may be understood that there are significant problems and shortcomings associated with current solutions and technologies for encapsulating pigment flakes with a metal oxide coating.

SUMMARY

Accordingly, an aspect of the present disclosure relates to a method of encapsulating pigment flakes with a metal oxide coating, the method comprising: mixing pigment flakes with a solvent; adding a metal salt to the solvent; and adding a reducing agent to the solvent, so as to encapsulate the pigment flakes with a metal oxide coating, wherein the metal salt is a precursor to the metal oxide coating.

BRIEF DESCRIPTION OF THE DRAWINGS

Numerous exemplary embodiments will now be described in greater detail with reference to the accompanying drawings wherein.

DETAILED DESCRIPTION

In an exemplary embodiment, the present disclosure provides a method of encapsulating pigment flakes with a metal oxide coating.

Conventional methods of encapsulating pigment flakes with a metal oxide coating have several drawbacks. For example, a sol-gel process using tetraethyl orthosilicate (TEOS) as a precursor may be used to encapsulate pigment flakes with a silicon dioxide coating. However, in general, the silicon dioxide coating formed by this sol-gel process is porous and must be relatively thick, e.g., 60 nm to 70 nm in thickness, to provide sufficient protection from environmental attack. Unfortunately, the large thickness of the silicon dioxide coating can be detrimental to the optical performance of the pigment flakes.

As described in U.S. Pat. No. 6,287,695 to Kaupp et al., issued on Sep. 11, 2001, which is incorporated herein by reference in its entirety, a metal oxide and/or metal hydroxide coating may be deposited as a passivating protective coating on exposed metal surfaces of pigment flakes by hydrolysis of a metal salt or a metal acid ester, where the metal is boron, aluminum, tin, titanium, vanadium, chromium, molybdenum, zinc, or cerium.

Such methods may not always be applicable to all types of pigment flakes. For example, some methods may require a relatively high-pH environment in which some types of pigment flakes may be damaged by corrosion and/or etching. Furthermore, such methods may not always provide an ideal metal oxide coating.

Unlike conventional methods of encapsulating pigment flakes with a metal oxide coating, the methods described herein may use a reducing agent. The reducing agent may generate metal from a metal salt, which is subsequently oxidized to form the metal oxide coating on the pigment flakes.

Figure 1A:
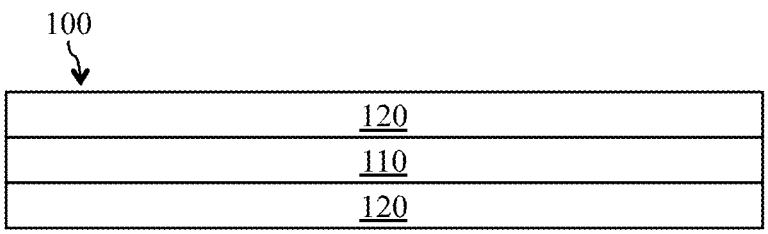
FIG. 1A is a schematic illustration of a cross-section of an exemplary embodiment of a pigment flake.

With reference to FIG. 1A, an exemplary embodiment of a pigment flake 100 suitable for encapsulation includes a central metal layer 110 and outer dielectric layers 120. For example, the pigment flake 100 may be a $MgF_2/Al/MgF_2$ pigment flake in which the metal layer 110 is formed of aluminum, and the dielectric layers 120 are formed of magnesium fluoride ($MgF_2$). The metal layer 110 has a top surface, a bottom surface, and at least one side surface. The dielectric layers 120 cover the top and bottom surfaces of the metal layer 110, but not the side surface of the metal layer 110. Accordingly, the side surface of the metal layer 110 is exposed to the environment and susceptible to corrosion.

Moreover, the dielectric layers 120 themselves are exposed to the environment. It should be appreciated that the dielectric layers 120, particularly, when formed of magnesium fluoride, may contain a significant number of defects which can provide additional sites of environmental attack on the metal layer 110. Furthermore, the dielectric layers 120, which are often assumed to be chemically inert, may themselves be attacked and etched by the environment. For example, the sol-gel process mentioned heretofore, which uses tetraethyl orthosilicate (TEOS) as a precursor to form a silicon dioxide coating, may require a relatively high-pH environment in which the dielectric layers 120 and the metal layer 110, via its unprotected side surface and via defects in the dielectric layers 120, may be attacked.

Figure 1B:
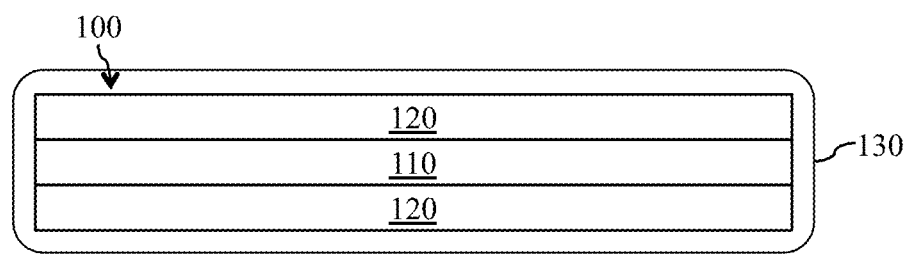
FIG. 1B is a schematic illustration of a cross section of the pigment flake of FIG. 1A encapsulated with a metal oxide coating.

With reference to FIG. 1B, the methods described herein may allow the pigment flake 100 to be encapsulated with a thin metal oxide coating 130 for passivation and protection. Advantageously, the method may not require a high-pH environment that can damage the pigment flake 100 through etching and/or corrosion. The metal oxide coating 130 may fully encapsulate the pigment flake 100 and may completely cover most or all exposed surfaces of the pigment flake 100. Preferably, the metal oxide coating 130 may be continuous over most or all exposed surfaces of the pigment flake. In particular, the metal oxide coating 130 may cover and protect the exposed side surface of the metal layer 110, inhibiting corrosion of the metal layer 110. The metal oxide coating 130 may also cover and protect the exposed surfaces of the dielectric layers 120. Accordingly, the encapsulated pigment flake 100 may be well-suited for use in a water-based paint.

In general, the methods described herein may allow pigment flakes of any suitable type to be encapsulated with a metal oxide coating. The pigment flakes may be single-layer or multilayer pigment flakes. The pigment flakes may be flat or may a incorporate diffractive structure. Typically, the pigment flakes may be metal-containing pigment flakes each including at least one metal layer, such as an aluminum layer, with at least one exposed surface. Often, the pigment flakes may also each include at least one dielectric layer, such as a magnesium fluoride layer, with at least one exposed surface. In some instances, the pigment flakes may each include a metal layer having a top surface, a bottom surface, and at least one side surface, and dielectric layers covering the top and bottom surfaces of the metal layer, but not the at least one side surface of the metal layer. For example, the pigment flakes may be three-layer D/M/D pigment flakes, such as $MgF_2/Al/MgF_2$ pigment flakes, five-layer M/D/M/D/M pigment flakes, such as $Cr/MgF_2/Al/MgF_2/Cr$ pigment flakes, or seven-layer D/M/D/M/D/M/D pigment flakes, such as $MgF_2/Cr/MgF_2/Al/MgF_2/Cr/MgF_2$ pigment flakes, where D is a dielectric layer and M is a metal layer. Alternatively, the pigment flakes may be all-dielectric pigment flakes each including at least one dielectric layer, such as a magnesium fluoride layer, with at least one exposed surface.

The one or more metal layers may be formed of any suitable metallic material. The metallic material may be a reflective metallic material and/or a metallic absorber material. Non-limiting examples of suitable reflective metallic materials may include aluminum, silver, copper, gold, platinum, tin, titanium, palladium, nickel, cobalt, rhodium, niobium, chromium, and compounds, combinations, or alloys thereof. Non-limiting examples of suitable metallic absorber materials may include chromium, nickel, aluminum, silver, copper, palladium, platinum, titanium, vanadium, cobalt, iron, tin, tungsten, molybdenum, rhodium, niobium, and compounds, combinations, or alloys thereof. Other various variations may also be provided.

The one or more dielectric layers may be formed of any suitable dielectric material. The dielectric material may be a high-index dielectric material, having a refractive index of greater than about 1.65, or a low-index dielectric material, having a refractive index of less than about 1.65.

Non-limiting examples of suitable high-index dielectric materials may include zinc sulfide (ZnS), zinc oxide (ZnO), zirconium oxide ($ZrO_2$), titanium dioxide ($TiO_2$), diamond-like carbon, indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II,III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon, silicon monoxide (SiO), selenium trioxide ($Se_2O_3$), tin oxide ($SnO_2$), tungsten trioxide ($WO_3$), combinations thereof, and the like. Other examples of suitable high-index dielectric materials include mixed oxides such as those described in U.S. Pat. No. 5,989,626 to Coombs et al., issued on Nov. 23, 1999, which is incorporated herein by reference in its entirety. When the dielectric materials of U.S. Pat. No. 5,989,626 are used in dielectric layers, they are most commonly oxidized to their stoichiometric state such as $ZrTiO_4$. Non-limiting examples of such mixed oxides may include zirconium titanium oxide, niobium titanium oxide, combinations thereof, and the like.

Non-limiting examples of suitable low-index dielectric materials may include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, and the like. Other examples of suitable low-index dielectric materials may include organic monomers and polymers, including alkenes such as dienes, acrylates (e.g., methacrylate), perfluoroalkenes, polytetrafluoroethylene (Teflon), fluorinated ethylene propylene (FEP), combinations thereof, and the like.

The pigment flakes may be fabricated by any suitable method. Typically, the pigment flakes are fabricated by depositing a single-layer or multilayer film on a substrate, stripping the film from the substrate, and grinding the resulting product. Of course, the fabrication method may include different steps or additional steps, e.g., steps to remove impurities, such as sodium chloride, or steps to create break lines in the film.

Examples of suitable pigment flakes, as well as methods of fabricating such pigment flakes, are disclosed in U.S. Pat. No. 6,013,370 to Coulter et al., issued on Jan. 11, 2000, in U.S. Pat. No. 6,157,489 to Bradley, Jr. et al., issued on Dec. 5, 2000, in U.S. Pat. No. 6,692,830 to Argoitia et al., issued on Feb. 17, 2004, and in U.S. Pat. No. 6,841,238 to Argoitia et al., issued on Jan. 11, 2005, all of which are incorporated herein by reference in their entireties. Other examples of suitable pigment flakes may include SpectraFlair® and ChromaFlair® pigment flakes sold by JDS Uniphase Corporation.

In general, the methods described herein may be performed on the as-fabricated pigment flakes without any pretreatment. The methods may allow the pigment flakes to be encapsulated with a metal oxide coating while minimizing damage to the pigment flakes through etching and/or corrosion.

The metal oxide coating may be a transition metal oxide coating, such as a zinc oxide coating and/or a zirconium oxide coating, a main-group metal oxide coating, such as a tin oxide coating, a rare-earth metal oxide coating, such as a cerium oxide coating, or a mixture thereof. In some embodiments, the metal oxide coating may be a zinc oxide coating. The metal oxide coating comprises a metal oxide, such as zinc oxide (ZnO), zirconium oxide ($ZrO_2$), tin oxide ($SnO_2$), or cerium oxide ($CeO_2$), but may also comprise impurities such as water, hydroxyl groups, or alkoxyl groups. In some embodiments, the metal oxide coating may consist essentially of the metal oxide. In some embodiments, the metal oxide coating may consist essentially of zinc oxide. The encapsulated pigment flakes may, typically, comprise about 5 wt % to about 15 wt % metal oxide coating, preferably, about 8 wt % metal oxide coating. Other various ratios may also be provided.

In some embodiments, the metal oxide coating may be a thin layer, typically, having a thickness of about 5 nm to about 20 nm, preferably, having a thickness of about 10 nm to about 15 nm, that provides passivation and protection. Alternatively, the metal oxide coating may be a thicker layer, typically, having a thickness of about 20 nm to about 300 nm, that contributes to the optical design of the pigment flakes. The metal oxide coating may fully encapsulate the individual pigment flakes and/or completely cover most or all exposed surfaces of the individual pigment flakes. In particular, when the pigment flakes are metal-containing pigment flakes each including at least one metal layer with at least one exposed surface, the metal oxide coating may cover and protect the exposed surface of the metal layer, inhibiting corrosion of the metal layer. When the pigment flakes each include at least one dielectric layer with at least one exposed surface, the metal oxide coating may cover and protect the exposed surface of the dielectric layer. In some embodiments, the metal oxide coating may be continuous over most or all exposed surfaces of the individual pigment flakes. Specifically, the metal oxide coating may be substantially free of defects and may be impermeable to water. Also, the metal oxide coating may be substantially uniform and conformal to the individual pigment flakes.

The metal oxide coating may be formed by wet-chemical methods, which are, typically, carried out in a single container, i.e., as one-pot reactions. According to the methods, the pigment flakes may be mixed with a solvent, a metal salt may be added to the solvent, and a reducing agent may be added to the solvent, so as to encapsulate the pigment flakes with a metal oxide coating. Advantageously, the methods may not require the addition of a strong base. The order of the method steps may be varied and, in some instances, the method steps may be carried out simultaneously. For example, the methods may be carried out in a continuous flow reactor where the pigment, metal salt, reducing agent, and solvent may be mixed, the reaction allowed to proceed, and the resulting encapsulated pigment flakes may be filtered and washed, in a continuous fashion.

In an exemplary embodiment, the pigment flakes may be mixed with the solvent, typically, at a concentration of about 10 g/L to about 300 g/L. Optionally, the pigment flakes may be dispersed in the solvent by adding a cosolvent to the solvent or by adding a surfactant to the solvent, typically, at a concentration of about 1 mM to about 30 mM. The metal salt may be dissolved in the solvent, typically, at a concentration of about 1 mM to about 100 mM, preferably, at a concentration of about 20 mM to about 100 mM, forming a solution. The reducing agent may be introduced into the solution, typically, in an amount of about 1.5 moles to about 25 moles per mole of metal cation. Consequently, the metal oxide coating may be deposited from the solution onto the pigment flakes.

The metal salt, which is a precursor to the metal oxide coating, may serve as a metal source. In general, the metal salt may be soluble in the solvent used and may dissolve in the solvent to provide metal cations. The metal salt may be a transition metal salt, such as a zinc salt and/or a zirconium salt, a main-group metal salt, such as a tin salt, a rare-earth metal salt, such as a cerium salt, or a mixture thereof. In some embodiments, the metal salt may be a zinc salt, which may serve as a metal source for a zinc oxide coating. Also, the metal salt may include an anion that does not react with the pigment flakes. Typically, the metal salt, which may or may not be a hydrate, may be a metal mineral acid salt, such as a metal nitrate, a metal sulfate, a metal phosphate, and/or a metal chloride, a metal organic acid salt, such as a metal acetate, or a mixture thereof. For example, the metal salt may be zinc nitrate hexahydrate ($Zn(NO_3)_2 \cdot 6H_2O$).

In general, the solvent may be a polar solvent that dissolves the metal salt. Typically, the solvent may be water, an alcohol, such as methanol, ethanol, isopropanol, ethylene glycol, and/or butyl cellosolve (ethylene glycol butyl ether), an ester, such as ethyl acetate, or a mixture thereof. In some embodiments, the solvent may be ethanol. Optionally, a cosolvent, such as butyl cellosolve, or a surfactant may be added to the solvent to facilitate dispersion of the pigment flakes in the solvent.

In a preferred embodiment, a surfactant may be added to the solvent to facilitate dispersion of the pigment flakes in the solvent. Typically, the surfactant may be a carboxylic acid, such as benzoic acid, octanoic acid, or hexadecanoic acid. Advantageously, because such carboxylate-containing surfactants have an affinity for the metal oxide coating, their use may lead to a smoother coating. Such surfactants may also remain on the surface of the encapsulated pigment flakes, rendering the encapsulated pigment flakes hydrophobic, which can lead to improved leafing of the pigment flakes.

The reducing agent may be a hydride reducing agent, such as sodium borohydride ($NaBH_4$) or lithium aluminum hydride ($LiAlH_4$), or a borane complex reducing agent, such as borane tert-butylamine complex (($CH_3)_3CNH_2 \cdot BH_3$). In some embodiments, the reducing agent may be sodium borohydride. In such embodiments, the reaction may be carried out at room temperature, and sodium borohydride may be dripped into the reaction mixture, i.e., the solvent containing the pigment flakes and the metal salt, to control the reaction rate. The total reaction time may, typically, be less than about 24 h, preferably, less than about 1 h. In some instances, the reaction may be complete by the time that the addition of the reducing agent is complete. In other embodiments, the reaction conditions and reaction time may be adjusted to compensate for the reactivity of the reducing agent. For example, when a less reactive borane complex is used as the reducing agent, the borane complex may be added all at once to the reaction mixture, the reaction mixture may be heated, and the reaction time may be increased.

It should be appreciated that the use of a reducing agent may be advantageous in producing a metal oxide coating providing effective and complete encapsulation. It is believed that the reducing agent may reduce the metal cation of the metal salt, forming a thin metal coating on the pigment flakes as an intermediate, and that the metal coating may then be oxidized in situ, forming the metal oxide coating. For example, the solvent, trace water in the solvent, and/or atmospheric oxygen may act as the oxidizing agent. It is thought that the intermediate metal coating may serve as an adhesion-promoting layer that facilitates further coating growth. As the reducing agent is added, the pigment flakes have been observed to become darker and less reflective for a time, before largely regaining their original appearance. This color change may be associated with a change from an absorbing metal coating to a transparent metal oxide coating.

Once the desired encapsulating metal oxide coating has been formed on the pigment flakes, the encapsulated pigment flakes may be washed, typically, several times with ethanol, to remove excess metal oxide and other byproducts. The encapsulated pigment flakes may then be separated from the solvent by vacuum filtration, cyclonic separation, or centrifugation. Optionally, the encapsulated pigment flakes may also be dried, typically, in air at a temperature of about 80° C. to about 150° C., alternatively, under vacuum, to remove any remaining solvent. However, baking or calcination at higher temperatures may not be required.

To further illustrate the present invention, the following examples are provided.

In a first example, $MgF_2/Al/MgF_2$ pigment flakes, known as SpectraFlair® Bright Silver, were encapsulated with a zinc oxide coating according to the method described heretofore. A filtered solution of sodium borohydride (0.9 g) in ethanol (200 proof, 20 mL) was dripped into a mixture of the $MgF_2/Al/MgF_2$ pigment flakes (1 g) and zinc nitrate hexahydrate (0.31 g) in ethanol (200 proof, 50 mL) at room temperature. The mixture was stirred for 1 h. The supernatant was then decanted, and the ZnO-encapsulated $MgF_2/Al/MgF_2$ pigment flakes were washed several times with ethanol (200 proof) and filtered by vacuum. The ZnO-encapsulated $MgF_2/Al/MgF_2$ pigment flakes were then dried at about 80° C. in air. Elemental analysis of the zinc oxide coating by X-ray photoelectron spectroscopy (XPS) indicated that it consisted essentially of zinc and oxygen, with carbon-containing impurities. Notably, the measured amounts of magnesium and fluorine were insignificant, indicating coverage of the magnesium fluoride layers by the zinc oxide coating.

Figure 2A:
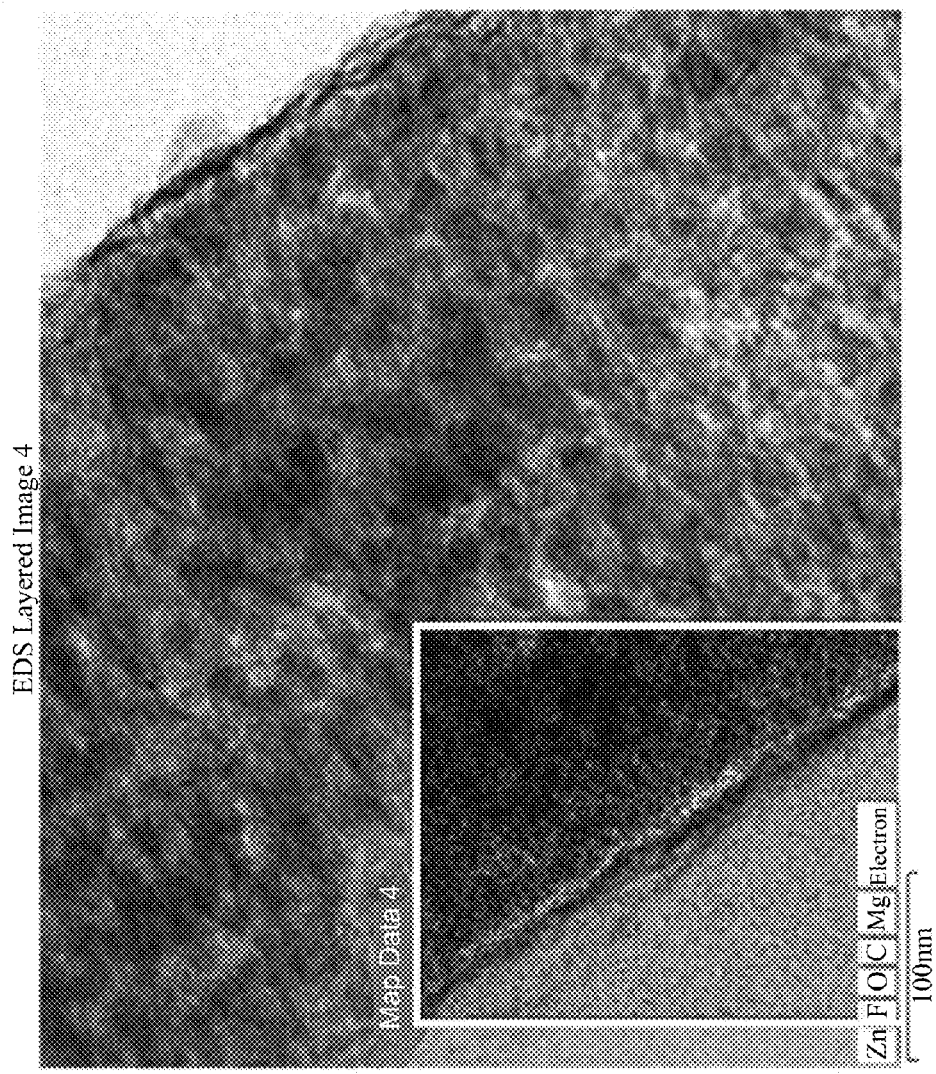
FIG. 2A is a scanning transmission electron microscope (STEM) image of a cross section of a ZnO-encapsulated $MgF_2/Al/MgF_2$ pigment flake.
Figure 2B:
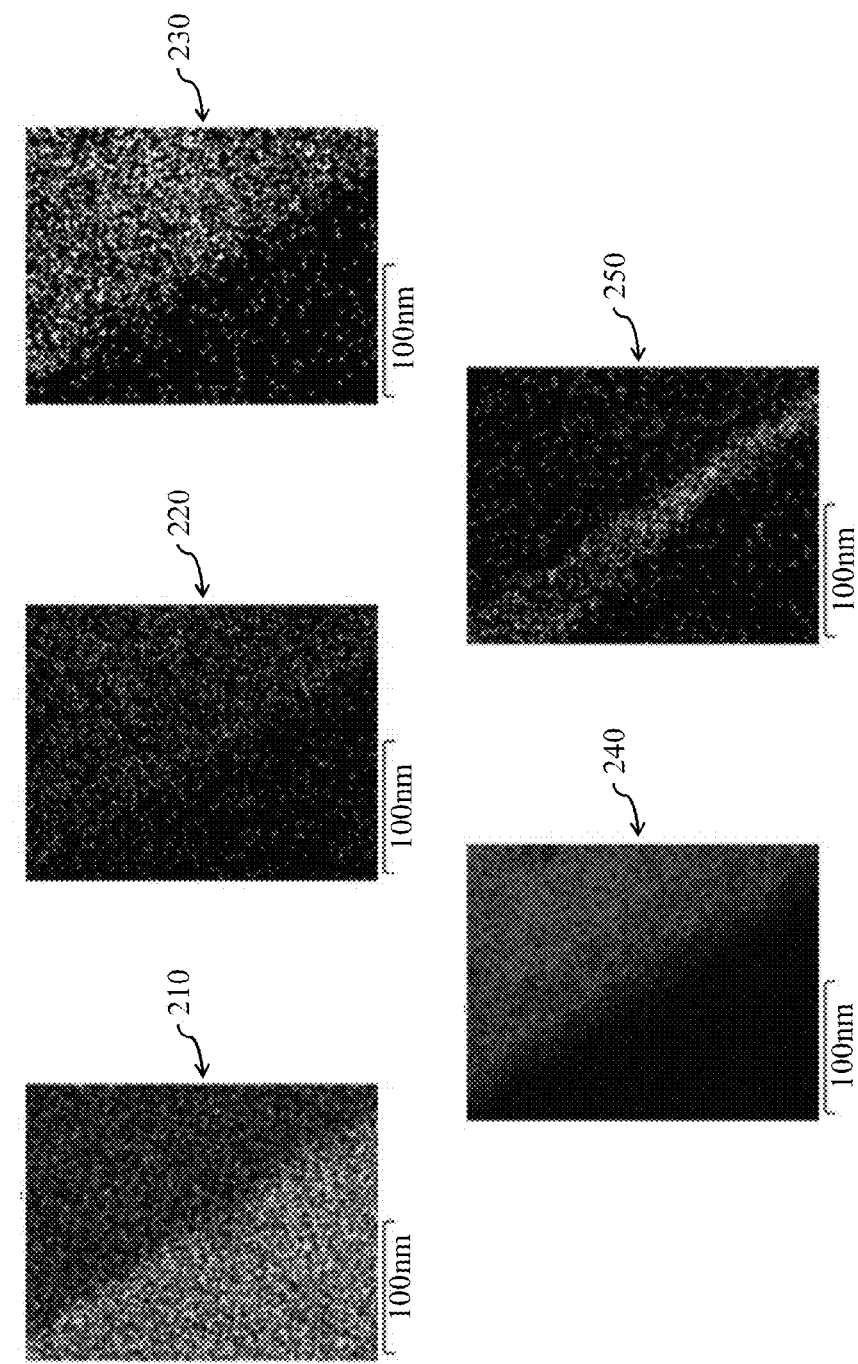
FIG. 2B is a set of energy dispersive X-ray spectroscopic (EDS) element maps corresponding to the boxed region of FIG. 2A for carbon, oxygen, fluorine, magnesium, and zinc, respectively.

A scanning transmission electron microscope (STEM) image of a cross section of a ZnO-encapsulated $MgF_2/Al/MgF_2$ pigment flake is shown in FIG. 2A. Energy dispersive X-ray spectroscopic (EDS) element maps corresponding to the boxed region of FIG. 2A for carbon 210, oxygen 220, fluorine 230, magnesium 240, and zinc 250 are shown in FIG. 2B. A magnesium fluoride layer is visible, surrounded by the embedding medium used to prepare the cross section. Notably, there is a large concentration of zinc along the edge of the pigment flake, corresponding to the zinc oxide coating. It is apparent that the zinc oxide formed a thin coating on the surface of the pigment flake and did not react with or diffuse into the underlying pigment flake. The zinc oxide coating has a thickness of about 10 nm to about 15 nm.

Figure 3:
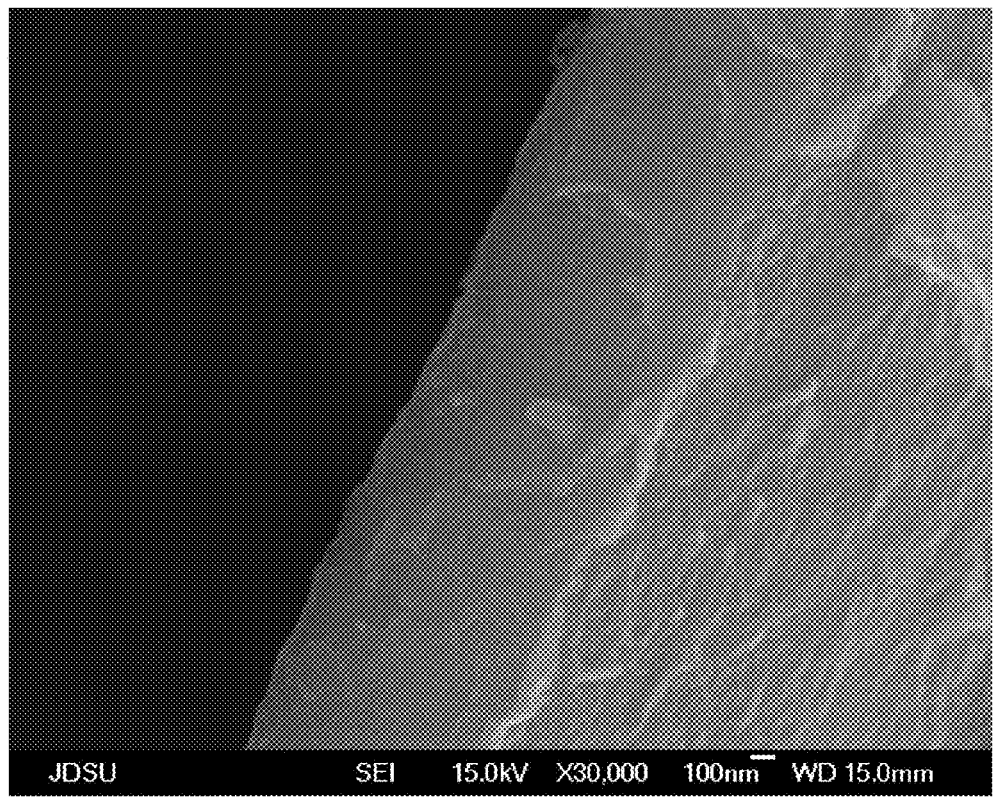
FIG. 3 is a scanning electron microscope (SEM) image of a ZnO-encapsulated $MgF_2/Al/MgF_2$ pigment flake.

A scanning electron microscope (SEM) image of a ZnO-encapsulated $MgF_2/Al/MgF_2$ pigment flake is shown in FIG. 3. An edge of the encapsulated pigment flake is visible. Notably, the zinc oxide coating completely covers all exposed surfaces of the pigment flake, and the underlying structure of the pigment flake is not visible. The roughness and defects in the magnesium fluoride layers and the exposed surface of the aluminum layer are covered and hidden by the zinc oxide coating.

In a second example, diffractive $MgF_2/Al/MgF_2$ pigment flakes, known as SpectraFlair® Silver 1500, were encapsulated with a zinc oxide coating according to the method described heretofore. A filtered solution of sodium borohydride (0.9 g) in ethanol (200 proof, 20 mL) was dripped into a mixture of the diffractive $MgF_2/Al/MgF_2$ pigment flakes (1 g) and zinc nitrate hexahydrate (0.31 g) in ethanol (200 proof, 50 mL) at room temperature. The mixture was stirred for 1 h. The supernatant was then decanted, and the ZnO-encapsulated diffractive $MgF_2/Al/MgF_2$ pigment flakes were washed several times with ethanol (200 proof) and filtered by vacuum. The ZnO-encapsulated diffractive $MgF_2/Al/MgF_2$ pigment flakes were then dried at about 80° C. in air.

In a third example, $Cr/MgF_2/Al/MgF_2/Cr$ pigment flakes, known as ChromaFlair®, were encapsulated with a zinc oxide coating according to the method described heretofore. A filtered solution of sodium borohydride (0.9 g) in ethanol (200 proof, 20 mL) was dripped into a mixture of the $Cr/MgF_2/Al/MgF_2/Cr$ pigment flakes (1 g) and zinc nitrate hexahydrate (0.31 g) in ethanol (200 proof, 50 mL) at room temperature. The mixture was stirred for 1 h. The supernatant was then decanted, and the ZnO-encapsulated $Cr/MgF_2/Al/MgF_2/Cr$ pigment flakes were washed several times with ethanol (200 proof) and filtered by vacuum. The ZnO-encapsulated $Cr/MgF_2/Al/MgF_2/Cr$ pigment flakes were then dried at about 80° C. in air.

In a fourth example, $MgF_2/Cr/MgF_2/Al/MgF_2/Cr/MgF_2$ pigment flakes were encapsulated with a zinc oxide coating according to the method described heretofore. A filtered solution of sodium borohydride (0.9 g) in ethanol (200 proof, 20 mL) was dripped into a mixture of the $MgF_2/Cr/MgF_2/Al/MgF_2/Cr/MgF_2$ pigment flakes (1 g) and zinc nitrate hexahydrate (0.31 g) in ethanol (200 proof, 50 mL) at room temperature. The mixture was stirred for 1 h. The supernatant was then decanted, and the ZnO-encapsulated $MgF_2/Cr/MgF_2/Al/MgF_2/Cr/MgF_2$ pigment flakes were washed several times with ethanol (200 proof) and filtered by vacuum. The ZnO-encapsulated $MgF_2/Cr/MgF_2/Al/MgF_2/Cr/MgF_2$ pigment flakes were then dried at about 80° C. in air.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

We claim:

1. A method of encapsulating pigment flakes with a metal oxide coating, the method comprising:
   mixing pigment flakes with a solvent;
   adding a metal salt to the solvent; and
   adding a reducing agent to the solvent, so as to encapsulate the pigment flakes with the metal oxide coating, wherein the metal salt is a precursor to the metal oxide coating.

2. The method of claim 1, wherein the metal oxide coating consists essentially of a metal oxide.

3. The method of claim 1, wherein the metal salt is a zinc salt, a zirconium salt, a tin salt, a cerium salt, or a mixture thereof, and the metal coating is a zinc oxide coating, a zirconium oxide coating, a tin oxide coating, a cerium oxide coating, or a mixture thereof.

4. The method of claim 1, wherein the metal salt is a zinc salt, and the metal oxide coating is a zinc oxide coating.

5. The method of claim 4, wherein the zinc oxide coating consists essentially of zinc oxide.

6. The method of claim 1, wherein the metal salt is a metal nitrate, a metal sulfate, a metal phosphate, a metal acetate, a metal chloride, or a mixture thereof.

7. The method of claim 1, wherein the solvent is water, an alcohol, an ester, or a mixture thereof.

8. The method of claim 1, wherein the reducing agent is a hydride reducing agent or a borane complex reducing agent.

9. The method of claim 1, wherein the reducing agent is sodium borohydride.

10. The method of claim 1, further comprising:
    adding a surfactant to the solvent to facilitate dispersion of the pigment flakes in the solvent.

11. The method of claim 1, wherein the metal salt dissolves in the solvent to provide metal cations, and the reducing agent reduces the metal cations.

12. The method of claim 1, wherein the metal oxide coating fully encapsulates each individual flake of the pigment flakes.

13. The method of claim 1, wherein the pigment flakes include at least one metal layer with at least one exposed surface.

14. The method of claim 1, wherein the pigment flakes include:
   a metal layer having a top surface, a bottom surface, and at least one side surface; and
   dielectric layers covering the top surface and the bottom surface of the metal layer, but not the at least one side surface of the metal layer.

15. The method of claim 14, wherein the metal layer is formed of aluminum, and the dielectric layers are each formed of magnesium fluoride.

16. The method of claim 1, wherein the pigment flakes comprise one of three-layer pigment flakes, five-layer pigment flakes, or seven-layer pigment flakes.

17. The method of claim 1, wherein the metal salt comprises one or more of a transition metal salt, a main-group metal salt, or a rare-earth metal salt.

18. The method of claim 1, wherein adding the reducing agent comprises:
   dripping the reducing agent into the solvent.

19. The method of claim 1, further comprising:
   washing the pigment flakes with ethanol after adding the reducing agent to the solvent.

* * * * *